United States Patent [19]
Griffith et al.

[11] Patent Number: 5,426,689
[45] Date of Patent: Jun. 20, 1995

[54] CORDLESS HEADSET TELEPHONE FOR USE WITH A BUSINESS TELEPHONE

[75] Inventors: Gary L. Griffith, Arvada; Norman W. Petty, Boulder, both of Colo.

[73] Assignee: AT&T Corp., Murray Hill, N.J.

[21] Appl. No.: 204,696

[22] Filed: Mar. 2, 1994

Related U.S. Application Data

[63] Continuation of Ser. No. 905,689, Jun. 29, 1992, abandoned.

[51] Int. Cl.6 .............................................. H04M 11/00
[52] U.S. Cl. ........................................... 379/58; 379/61
[58] Field of Search ............... 379/58, 61, 428, 430, 379/433, 436, 441, 442, 447

[56] References Cited

U.S. PATENT DOCUMENTS

| | | | |
|---|---|---|---|
| 4,853,951 | 8/1988 | Bauer | 379/62 |
| 4,882,745 | 11/1989 | Silver | 379/61 |
| 4,908,847 | 3/1990 | Hannon et al. | 379/61 |
| 5,010,565 | 4/1991 | Nash et al. | 379/58 X |

FOREIGN PATENT DOCUMENTS 9208310 5/1992 WIPO .................... H04M 11/00

OTHER PUBLICATIONS

HelloDirect Inc., "Walk-N-Talk" Phone, 1-91, p. 51.

Primary Examiner—Curtis Kuntz
Assistant Examiner—G. J. Oehling
Attorney, Agent, or Firm—John C. Moran

[57] ABSTRACT

A wireless headset telephone whose base station interconnects to a standard electronic telephone station set via the speaker phone port of the standard electronic station set. The user of the wireless headset telephone is able to answer incoming telephone calls having been alerted by an audible signal and can originate calls by utilizing the dialing pad associated with the headset. The wireless headset telephone comprises a headset with a microphone and a mobile unit with an associated key pad. The mobile unit is designed so that it may be worn by the user of the headset in a manner similar to the well known Walkman radio sets. The mobile unit includes all of the communication circuits required to maintain a radio frequency link with a base station which is connected to the electronic telephone set.

6 Claims, 3 Drawing Sheets

CORDLESS HEADSET TELEPHONE FOR USE WITH A BUSINESS TELEPHONE

This application is a continuation of application Ser. No. 07/905,689, filed on Jun. 29, 1992.

TECHNICAL FIELD

The present invention relates to telephone station sets and, in particular, to a wireless headset telephone plugging directly into a station set.

BACKGROUND OF THE INVENTION

Within the everyday work environment, cordless telephones have been found to be extremely useful. However, a conventional cordless telephone in the form of a hand-held handset has been found to be inconvenient in many working conditions because of the need to carry the handset. A cordless telephone instrument in the form of a headset which is worn on the head of the user has been found to be very useful, since both of the user's hands are free to do tasks other than holding the cordless telephone set. One such cordless headset telephone is described in U.S. Pat. No. 4,882,745. This patent discloses a wireless headset telephone whose base station requires a separate analog telephone line or a bridge onto an analog telephone line being used by a role phone station set. The problem with this wireless headset telephone is the need for either utilizing a separate telephone line or requiring an analog telephone line which can be shared with an existing telephone station set. This is a particular disadvantage where the telephone station set is of the electronic variety using either the ISDN digital protocol or a proprietary digital protocol of a switch manufacturer. Most of the business communications systems (also referred to as PBXs) use either the ISDN digital protocol or a proprietary digital protocol unique to that particular manufacturer. In addition, there is a rapid growth in the number of ISDN telephone station sets used by small businesses which are connected to central office switching equipment.

These digital protocols do not allow the base station of the above-referenced patent to be bridged onto a digital link being used by a digital telephone station set. In addition, the costs of providing these digital protocol telephone links is higher than that of an analog link, making it undesirable to have a separate digital link for the wireless headset telephone. Also, there is the problem of having two telephone numbers when a separate digital link is utilized for the wireless headset telephone.

To overcome this problem associated with digital protocol telephone links, it is known in the art to interconnect the base station to the telephone station set by plugging the base station into the telephone station set in place of the handset of the telephone station set. One such wireless headset telephone is Hello Set Model 1341R manufactured by Hello Direct Inc. The problem with this approach is that the user of the headset cannot originate a call or answer an incoming call without physically operating the telephone station set. This is a serious disadvantage, since it restricts the movement of the user with respect to the telephone station set.

One possibility for overcoming the above-mentioned problems would be to design a new telephone station set which allowed for the connection of the base station in such a manner that call origination and call answering could be done from the headset unit itself. The problem with this approach is that electronic telephone station sets are expensive, and owners of these station sets would be reluctant to buy a new station set to obtain the ability to interconnect a cordless headset telephone. In addition, there would have to be a unique base station for each of the proprietary digital protocols. Since the volume of the new telephone station sets would be low relative to the total volume of regular telephone station sets, these new telephone station sets would be expensive.

There exists the need for a cordless headset telephone whose base station can be attached to a standard electronic telephone station set, yet this cordless headset telephone should be able to answer calls and to originate calls remotely from the electronic telephone station set.

SUMMARY OF THE INVENTION

The aforementioned problems are solved and a technical advance is achieved in the art by a wireless headset telephone whose base station interconnects to a standard electronic telephone station set via the speaker phone port of the standard electronic station set. The user of the wireless headset telephone is able to answer incoming telephone calls having been alerted by an audible signal from the headset and can originate calls by utilizing the dialing pad associated with the headset.

The wireless headset telephone comprises a headset with a microphone and a mobile unit with an associated key pad. The mobile unit is designed so that it may be worn by the user of the headset in a manner similar to the well known Walkman radio sets. The mobile unit includes all of the communication circuits required to maintain a radio frequency link with a base station which is connected to the electronic telephone set.

Advantageously, in another embodiment, the headset incorporates the communication circuitry of the mobile unit and a single switch which allows the user to answer calls but not to originate calls. This headset is designed for use where the user does not need to originate calls and where there is a need not to have the inconvenience of a separate mobile unit.

DETAILED DESCRIPTION

Figure 1:
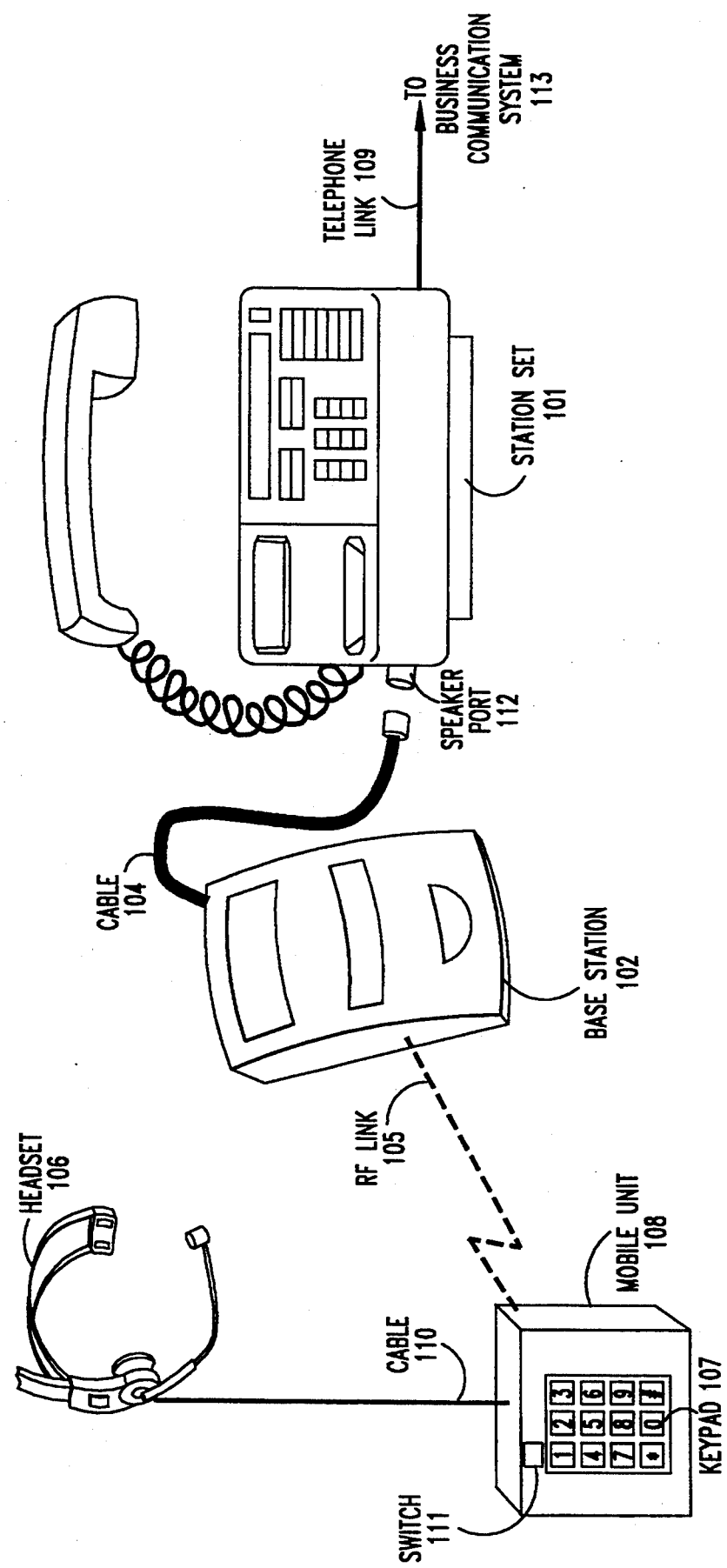
FIG. 1 illustrates, in pictorial form, a wireless telephone headset interconnected to the speaker phone port of an electronic telephone station set via a base station.

FIG. 1 illustrates, in pictorial form, a wireless headset telephone (comprising headset 106, mobile unit 108, and key pad 107) interconnected to its base station 102 via RF link 105. Base station 102 is interconnected to station set 101 via cable 104 and speaker phone port 112 of station set 101. In turn, station set 101 is interconnected to business communications system 113 via telephone link 109. Business communication system 113 may advantageously be the AT&T Definity Business Communication System, and station set 101 may advantageously be an AT&T electronic telephone station set used with the Definity Business Communication System. Mobile unit 108 is designed to attach to an individual's belt, or the user can use a carrying strap to hang the unit from the user's person. By attaching mobile unit 108 to the belt, the user then has his/her hands free to perform a variety of tasks and yet still be able to carry on a telephone conversation. More importantly, the user is able to accept calls using switch 111 and to originate calls using switch 111 and key pad 107. This allows the user mobility which is only limited by the range of RF link 105. Utilizing spread spectrum technology, this range could be in the hundreds of yards. However, using conventional wireless telephone technology, the range would be more limited. Spread spectrum technology also has the advantage that a number of the wireless headset telephones could be used within the same office building.

When call alerting information is received from business communication system 113 via telephone link 109, station set 101 transmits an alerting signal to base station 102 via cable 104. In response to this alerting signal, base station 109 signals mobile unit 108 via RF link 105. Mobile unit 108 alerts the user via a tone transducer in headset 106. If the user wishes to answer the call, the user actuates switch 111. In response to this actuation, mobile unit 108 transmits back an off-hook signal via RF link 105 to base station 102. The off-hook signal is a state signal defining whether wireless telephone headset is active or idle. In turn, base station 102 transmits a signal via cable 104 which causes station set 101 to accept the telephone call being received via telephone link 109. A voice path is then established between headset 106 and telephone link 109 via cable 110, mobile unit 108, RF link 105, base station 102, cable 104, and station set 101. Alternately, mobile unit 108 can alert the user of the incoming call by transmitting a tone to headset 106.

To originate a call, the user depresses switch 111 on mobile unit 108 which transmits an originating signal to base station 102. This originating signal is then transmitted to business communication system 113 via base station 102 and station set 101. In addition, an audio communication path is set up between telephone link 109 and mobile unit 108. Business communication system 113 responds with dial signal which is relayed to base unit 108. In response to the dial signal, base unit 108 transmits a dial tone to headset 106. The user then dials a telephone number on key pad. This number is encoded and transmitted to base station 102. Base station 102 decodes the dialed number, converts it into standard multi-frequency tones, and transmits the tones to station set 101 via speaker phone port 112. Station set 101 retransmits the tones to business communication system 113 which places a telephone call in the standard manner.

Figure 2:
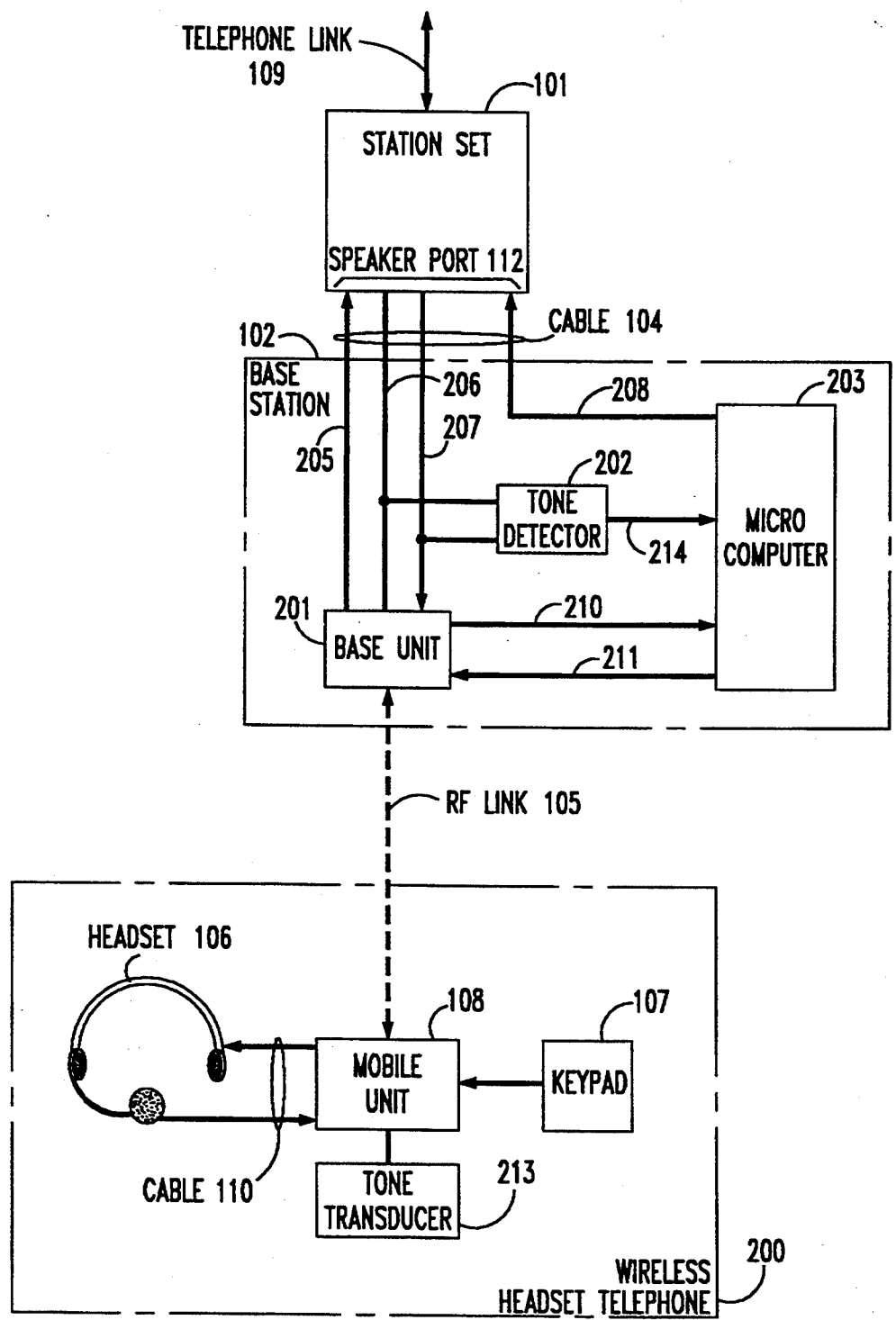
FIG. 2 illustrates, in block diagram form, a wireless headset telephone interconnected through its base station to a electronic telephone station set with the details of the wireless headset telephone and the base station being shown in block diagram form.

FIG. 2 illustrates, in block diagram form, base station 102 and wireless headset telephone 200. Base unit 201 and mobile unit 108 are well known wireless telephone units such as those utilized in the AT&T Cordless Telephone, Model 4305. Mobile unit 108 has been modified to work with headset 106 rather than the conventional handset. Further, mobile unit 108, key pad 107, and tone transducer 213 have been repackaged in order to be utilized in manner similar to a Walkman radio. Further, the conventional handset of the AT&T Cordless Telephone may be used in place of wireless headset telephone 200 if desired by the user.

Base unit 201 has been modified to eliminate the hybrid which normally would interface the base unit to an analog telephone line. Further, base unit 201 has been modified to accept an incoming talk path on conductors 206 and 207 and to transmit a talk path on conductors 205 and 206. In addition, base unit 201 indicates the origination of a call or acceptance of a call by transmitting a signal on conductor 210 to microcomputer 203 and is notified of an incoming call by microcomputer 203 transmitting an alerting signal on conductor 211. These two signals are communicated with mobile unit 108 by base unit 201 utilizing conventional wireless telephone technology.

Microcomputer 203 provides the control for base station 102. Tone detector 202 is utilized to detect the alerting signal from station set 102 indicating an incoming call. Station set 101 indicates an incoming call by transmitting a 1633 Hz signal on conductors 207 and 206. Upon detecting this 1633 Hz signal, tone detector 202 transmits a tone-detected signal on conductor 214 to microcomputer 203. If the tone-detected signal from tone detector 202 persists in excess of 300 milliseconds, microcomputer 203 is responsive to the signal on conductor 214 to transmit an alerting signal on conductor 211 to base unit 201 which then alerts the user of wireless headset telephone 200 as previously described.

Figure 3:
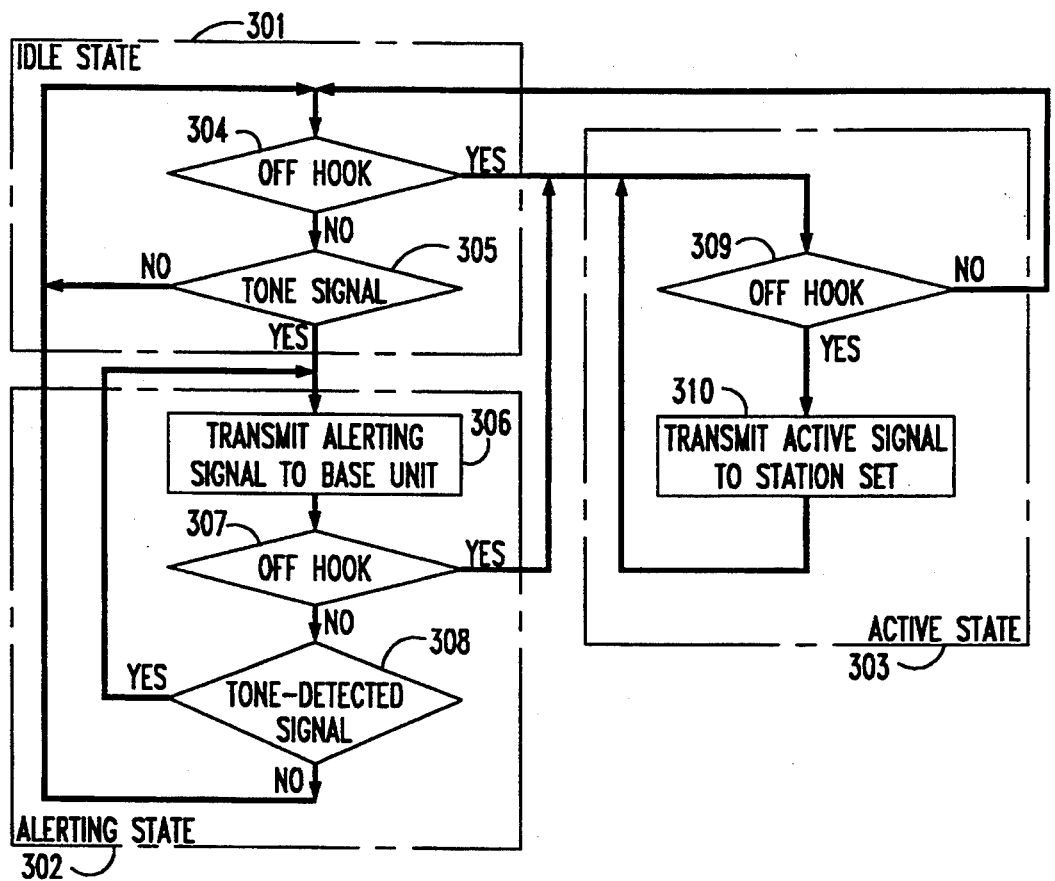
FIG. 3 illustrates, in flowchart form, the functions performed by the microcomputer contained within the base station of FIG. 2.

FIG. 3 shows the functions performed by the program controlling microcomputer 203 to provide the previously disclosed functions. Microcomputer 203 can be in one of three states: idle state 301, alerting state 302 or active state 303. When the user of wireless headset telephone 200 indicates the origination of a call by actuation of switch 111 of FIG. 1, mobile unit 108 transmits a signal via RF link 105 to base unit 201 indicating that wireless headset telephone 200 has gone off-hook. Base unit 201 is responsive to this signal to relay an off-hook signal via conductor 210 to microcomputer 203. Since the user is originating a call, microcomputer 203 is in idle state 301. Decision block 304 detects the off-hook signal from base unit 201 and transfers control to active state 303. Since the off-hook signal is being received, decision block 309 transfers control to block 310 which transmits the active signal to station set 101 via conductor 208. Station set 101 is responsive to the active signal received via conductor 208 to signal call origination to business communication system 113 via telephone link 109. Business communication system 113 responds with a dial tone which station set 101 transmits to base unit 201 via conductors 206 and 207. In turn, base unit 201 transfers the dial tone to mobile unit 208 via RF link 105. The user of wireless headset telephone 200 hears the dial tone via headset 106 and proceeds to dial the desired telephone number via key pad 107. Mobile unit 108 transmits this dialed information as encoded signals to base unit 201 via RF link 105. In response to these encoded signals, base unit 201 converts the encoded signals to multi-frequency dialing signals and transfers these multi-frequency signals to station set 101 via conductors 205 and 206. These signals are then communicated to business communication system 113 by station set 101. At this point in time, a full duplex audio path is established between business communication system 113 and headset 106. The functions after this point are those of a normal telephone conversation, and microcomputer 203 remains in active state 303.

If the user of wireless headset 201 indicates an on-hook by actuation of switch 111 of key pad 107, this indication is transferred by mobile unit 108 to base unit 201 and in turn to microcomputer 203 via conductor 210. The fact that the user has gone on-hook is detected by decision block 309 which returns microcomputer 203 to idle state 301. Since block 310 is no longer executed, the active signal is no longer transmitted to station set 101. Since station set 101 is no longer receiving the active signal via conductor 208, station set 101 performs the necessary signaling to terminate the call with business communication system 113.

Consider now how wireless headset telephone 200 answers an incoming call to station set 101 from business communication system 113. When station set 101 receives the alerting message from business communication system 113, it transmits on conductors 206 and 207 a tone signal of 1633 Hz. Tone detector 202 detects this tone and transmits a tone-detected signal to microcomputer 203. Decision block 305 is responsive to this tone-detected signal to assure that the tone-detected signal lasts for at least 300 microseconds. If the tone-detected signal is of sufficient duration, microcomputer 203 enters alerting state 302.

Block 306 transmits the alerting signal to base unit 301 via conductor 211, and base unit 201 transmits an alerting signal to mobile unit 108 which actuates tone transducer 213 or alternatively transmits a tone to headset 401. While in alerting state 302, microcomputer 203 continuously tests the off-hook signal from base unit 201 and the tone-detected signal from tone detector 202. If the tone signal is removed, decision block 308 returns microcomputer 203 to idle state 301 since this indicates that the calling party has terminated the call. If decision block 307 detects that the user of wireless headset telephone 200 has accepted the call by actuation switch 111, decision block 307 transfers control to active state 303, whose function was previously described.

Figure 4:
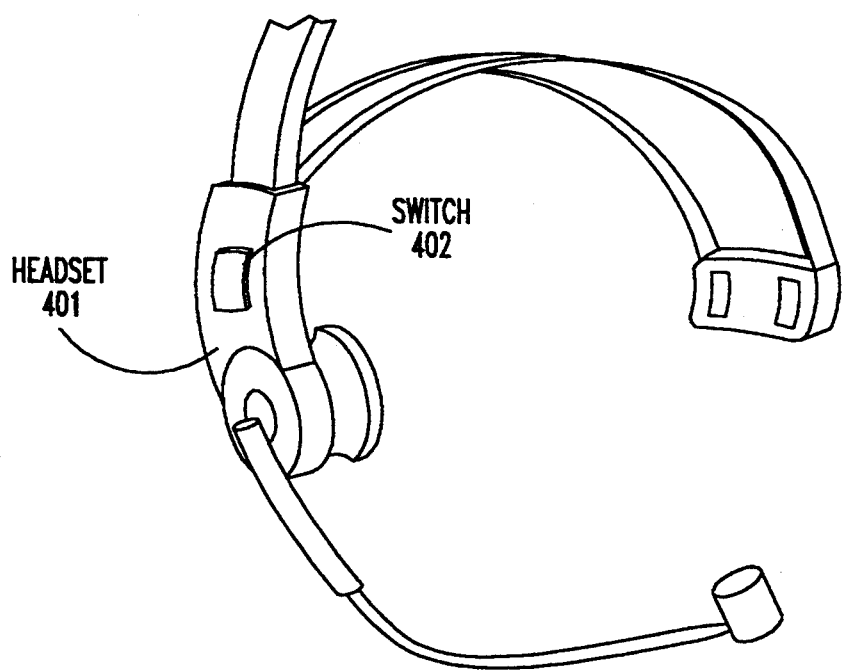
FIG. 4 illustrates, in pictorial form, a second embodiment of the invention.

FIG. 4 illustrates, in pictorial form, another embodiment of the invention. Headset 401 incorporates circuitry similar to that in mobile unit 108. This circuitry allows the headset to be worn with no attached cable. Headset 401 is limited to answering calls by actuation of switch 402 and can not originate calls since no dialing facilities are provided. Headset 401 is intended for those business environments where the user would rarely want to originate calls but must be constantly receiving calls. An auto parts store is an excellent example where the users are constantly answering calls and need to have mobility so that they may check for the availability of parts.

It is to be understood that the above-described embodiments are merely illustrative of the principles of the invention and other arrangements may be devised by those skilled in the art without departing from the spirit and the scope of the invention. In particular, spread spectrum technology can be used to establish RF link 105. Also, different signals may be exchanged between base station 102 and telephone station set 101 to control telephone calls.

We claim:

1. Apparatus for providing wireless telecommunication service via a telephone station set connected to a telephone switching system and the telephone station set has not been modified (unmodified) after being shipped from the manufacturing factory, comprising:

said unmodified telephone station set having a speaker phone port for allowing the interconnection of a speaker phone to said unmodified telephone station set;

a base station for interconnecting to said speaker phone port;

a wireless telephone headset for communicating control and audio call information with said base station via a wireless communication link;

said base station responsive to said control and audio call information for communicating said information with said unmodified telephone station set via said speaker phone port to allow a user of said wireless telephone headset to receive and place calls through said unmodified telephone station set by generating an offhook condition in said unmodified telephone station set.

2. The apparatus of claim 1 wherein said wireless telephone headset comprises a headset having earphones and microphone for communicating said audio information;

a mobile unit for interconnecting to said headset and for establishing said wireless communication link with said base station;

said mobile unit comprises a plurality of switches for generating a portion of said control information to place a call through said unmodified telephone station set and said portion of said control information being transmitted to said base station via said wireless communication link; and said base station further responsive to said generated portion of said control information for controlling the operation of said unmodified telephone station set to place said call through said unmodified telephone station set to said telephone switching system and for establishing an audio path between said mobile unit and said unmodified telephone station set through said base station and said wireless communication link.

3. The apparatus of claim 2 wherein said unmodified telephone station set responsive to an incoming call from said telephone switching system for transmitting an alerting signal to said base station;

said base station further responsive to said alerting signal from said telephone station set for transmitting an alerting signal of said control information to said mobile unit via said wireless communication link; and said mobile unit responsive to said alerting signal of said control information for alerting said user via said headset 4. The apparatus of claim 3 wherein the user of said wireless telephone headset accepts said incoming call by actuation of one of said plurality of said switches;

said mobile unit further responsive to said actuation of one of said plurality of said switches for transmitting a state signal of said control information to said base station whereby said state signal indicates acceptance of said incoming call by the user of said wireless telephone headset; and said base station further responsive to said state signal of said control information to transmit a call accept message to said unmodified telephone station set whereby said unmodified telephone station set accepts the incoming call from said telephone switching system.

5. The apparatus of claim 1 wherein said wireless telephone headset comprises a headset having earphones and microphone for communicating said audio information and built-in circuitry for establishing said wireless communication link with said base station;

said headset further comprises a switch for indicating the state of said wireless telephone headset;

said unmodified telephone station set responsive to an incoming call from said telephone switching system for transmitting an alerting signal to said base station;

said base station responsive to said alerting signal from said unmodified telephone station set for transmitting an alerting signal of said control information to said built-in circuitry via said wireless communication link; and said built-in circuitry responsive to said alerting signal of said control information for alerting said user via said headset; and said user of said wireless telephone headset accepts said incoming call by actuation of said switch;

said built-circuitry further responsive to said actuation of said switch for transmitting a state signal of said control information to said base station whereby said state signal indicates acceptances of said incoming call by said user of said wireless telephone headset; and said base station further responsive to said state signal of said control information to transmit a call accept message to said unmodified telephone station set whereby said unmodified telephone station set accepts the incoming call from said telephone switching system.

6. The apparatus of claim 1 wherein a conventional wireless handset is used in place of said wireless telephone headset.

* * * * *